United States Patent
Gouch et al.

(10) Patent No.: US 12,422,658 B2
(45) Date of Patent: Sep. 23, 2025

(54) METHOD FOR ANALYSING SCANNING EFFICACY

(71) Applicant: Ventana Medical Systems, Inc., Tucson, AZ (US)

(72) Inventors: Martin Philip Gouch, Hertfordshire (GB); Louise Joanne Collins, Hertfordshire (GB); William Hawes, Hertfordshire (GB)

(73) Assignee: Ventana Medical Systems, Inc., Tucson, AZ (US)

( * ) Notice: Subject to any disclaimer, the term of this patent is extended or adjusted under 35 U.S.C. 154(b) by 368 days.

(21) Appl. No.: 18/009,152

(22) PCT Filed: May 26, 2021

(86) PCT No.: PCT/GB2021/051271
§ 371 (c)(1),
(2) Date: Dec. 8, 2022

(87) PCT Pub. No.: WO2021/250373
PCT Pub. Date: Dec. 16, 2021

(65) Prior Publication Data
US 2023/0258919 A1 Aug. 17, 2023

(30) Foreign Application Priority Data
Jun. 9, 2020 (GB) ...................................... 2008690

(51) Int. Cl.
*G02B 21/24* (2006.01)
*G02B 21/00* (2006.01)
(Continued)

(52) U.S. Cl.
CPC ......... *G02B 21/244* (2013.01); *G02B 21/008* (2013.01); *G02B 21/367* (2013.01);
(Continued)

(58) Field of Classification Search
CPC .. G02B 21/244; G02B 21/008; G02B 21/367; G02B 21/002; G06T 7/0014;
(Continued)

(56) References Cited

U.S. PATENT DOCUMENTS

| | | |
|---|---|---|
| 9,116,035 B2 | 8/2015 | Gouch et al. |
| 2002/0090127 A1 | 7/2002 | Wetzel et al. |

(Continued)

FOREIGN PATENT DOCUMENTS

| | | | | |
|---|---|---|---|---|
| EP | 2 884 326 A1 | 6/2015 | | |
| EP | 3410395 B1 | * 3/2020 | ........... | G02B 21/002 |
| WO | 2018/224852 A2 | 12/2018 | | |

OTHER PUBLICATIONS

Hannah Thomson, "Image Analysis Quality Control Part 1: Image Scan QC", OracleBio, May 14, 2020, pp. 1-13.
(Continued)

*Primary Examiner* — Tarifur R Chowdhury
*Assistant Examiner* — Akbar H. Rizvi
(74) *Attorney, Agent, or Firm* — Lewis Roca Rothgerber Christie LLP

(57) ABSTRACT

A method is provided for operating a microscope scanner. A first imaging scan is performed of one or more area(s) of interest, AOI, on a target including a sample. This involves moving a detector array relative to the target along an image scan path and acquiring an image of the target at each of a plurality of locations along the image scan path. Focus control data is generated during the imaging scan by calculating a focus merit value at each said location along the image scan path. The focal height of the detector array is then adjusted along the image scan path based on the focus merit values. The efficacy of the first imaging scan is analysed using the focus control data and a change to one or more scanning parameters from the first imaging scan is (Continued)

determined, for the performance of a second imaging scan, based on this analysis.

20 Claims, 5 Drawing Sheets

(51) Int. Cl.
*G02B 21/36* (2006.01)
*G06T 7/00* (2017.01)

(52) U.S. Cl.
CPC .. *G06T 7/0014* (2013.01); *G06T 2207/10056* (2013.01); *G06T 2207/10148* (2013.01); *G06T 2207/30024* (2013.01); *G06T 2207/30168* (2013.01)

(58) Field of Classification Search
CPC . G06T 2207/10056; G06T 2207/10148; G06T 2207/30024; G06T 2207/30168; G06T 7/0012; G06T 7/80
See application file for complete search history.

(56) References Cited

U.S. PATENT DOCUMENTS

| | | | |
|---|---|---|---|
| 2004/0256538 A1 | 12/2004 | Olson et al. | |
| 2011/0298914 A1* | 12/2011 | Oshiro | G02B 21/244 348/79 |
| 2015/0153552 A1* | 6/2015 | Loney | G02B 21/361 250/453.11 |
| 2015/0168701 A1* | 6/2015 | Gouch | G02B 21/006 359/383 |
| 2017/0323431 A1 | 11/2017 | Sarkar et al. | |
| 2019/0266726 A1 | 8/2019 | Madabhushi et al. | |

OTHER PUBLICATIONS

Smart In Media GmbH&Co.KG, "PathoZoom Manual", Jul. 29, 2019, 88 pages, URL:https://www.smartinmedia.com/wp-content/uploads/sites/5/2020/12/Scan-Manual.pdf XP055829828 [retrieved on Aug. 3, 2021].

Smart in Media, "Tutorial PathoZoom Scan: installation, tools and options", Jul. 26, 2019 (Jul. 26, 2019), p. 1, Retrieved from the Internet: URL:https://www.youtube.com/watch?v=DzYelfD9G7g, XP054982106, [retrieved on Aug. 3, 2021].

Yilun Fan, "Methods for Rapid and High Quality Acquisition of Whole Slide Images", B. Eng Honours Thesis, The University of Queensland, Aug. 16, 2016, pp. i-133.

Yilun, Fan et al. "An algorithm for microscopic specimen delineation and focus candidate selection", Micron, Pergamon, Oxford, GB, vol. 66, Jun. 2, 2014 (Jun. 2, 2014), p. 51-62, XP029011169.

Bernd Lahrmann et al., Semantic Focusing Allows Fully Automated Single-Layer Slide Scanning of Cervical Cytology Slides, PLOS One, vol. 8, Issue 4, Apr. 9, 2013, pp. 1-10.

Written Opinion of PCT/GB2021/051271 dated Aug. 18, 2021.

International Search Report for PCT/GB2021/051271 dated Aug. 18, 2021.

Communication dated Aug. 5, 2024 issued by the Japanese Patent Office in application No. 2022-573304.

* cited by examiner

METHOD FOR ANALYSING SCANNING EFFICACY

This application is a National Stage of International Application No. PCT/GB2021/051271 filed May 26, 2021, which claims priority to United Kingdom Patent Application No. 2008690.6 filed Jun. 9, 2020.

FIELD OF THE INVENTION

The present invention relates to a method for analysing the efficacy of an imaging scan acquired using a microscope scanner.

BACKGROUND TO THE INVENTION

For pathology slides, a biopsy of tissue is mounted in a block of paraffin as support. A thin layer of approximately 4 µm is taken from the block and placed onto a slide. Then the slide is stained to show the tissue of interest and the background tissue. The paraffin is removed, by evaporation, and a protective coverslip is glued over the tissue. With the use of Whole Slide Imaging scanners, the tissue is then scanned to a digital file for either the pathologist to examine or software algorithms to examine and indicate if disease is present. Typically, the pixel size for digitising an image is around 0.25 µm and the natural aperture of the imaging limits the depth of focus to around 1 µm. The slide on which the tissue is mounted is not flat to within 1 µm. Standard equations of a perfectly manufactured slide indicate that the slide will bend by around 2 µm under its own weight and distortions from the manufacture and mounting of the slide can give much larger errors. The tissue itself is typically not always a uniform thickness with some parts of the tissue being sliced thinner than other types, or the tissue is sliced in a wedge shape.

If the Whole Slide Imaging scanner does not scan the tissue within the depth of focus, those areas outside the depth of focus will not be suitable for diagnosis or may give an error in diagnosis. Therefore, a Whole Slide Imaging scanner typically has a focus tracking mechanism such as that described by U.S. Pat. No. 9,116,035 to achieve the correct focus across all of the tissue. However, for a number of reasons, the tracking of the focus of the tissue may not be perfect across the whole of the tissue.

Once a slide has been scanned, it is possible to determine a number of aspects about how good the quality of the scan is by analysing the scanned image. For example, it is possible to analyse how well in focus the tissue is by examining the gradient at the edge of tissue items such as cells. For the whole of a slide this requires considerable processing power. A typical 15×15 mm area with 0.25 µm pixels will have 3.9 giga pixels. Before compression an RGB image will be 11 Gb of data. To examine the complete image in detail, for example as occurs in US 2019/0266726 A1, will be slow.

It is desirable to be able to examine the image rapidly immediately after the imaging scan is completed. If a fault in the scanning is identified whilst the slide is still in the scanner, it is possible to change the scanning conditions and perform a second scan which will not have the faults of the first scan. This second scan may have control parameters which are tuned to only this slide type or it may have different start conditions but typically it is possible to adjust the control parameters to improve the scan. To examine the whole of a 3.9 giga pixel image whilst the slide is still in the scanner may not be practical. The invention is set in the context of finding a quicker and more effective method for analysing the efficacy of the scanned image so that a second scan may be performed, if needed, that corrects any defects found in the first scan.

SUMMARY OF THE INVENTION

A first aspect of the invention provides a method for operating a microscope scanner comprising a detector array, the method comprising:
 performing a first imaging scan of one or more area(s) of interest, AOI, on a target, wherein the target comprises a sample, and wherein performing the first imaging scan comprises:
 moving the detector array relative to the target along an image scan path and acquiring an image of the target at each of a plurality of locations along the image scan path using the detector array;
 generating focus control data during the imaging scan, wherein generating focus control data comprises calculating a focus merit value at each said location along the image scan path; and
 adjusting the focal height of the detector array along the image scan path based on said focus merit values;
 analysing the efficacy of the first imaging scan using the focus control data and determining a change to one or more scanning parameters from the first imaging scan, for the performance of a second imaging scan, based on this analysis.

An improved method is therefore provided which analyses the efficacy of an imaging scan using focus control data generated during the imaging scan. Conventionally, the focus control data is generated for the purposes of performing the imaging scan only, whereas it is the image that is produced from the imaging scan that would be looked at to assess if the scan had been successful. In contrast, the above method uses the focus control data to analyse the efficacy of the imaging scan. This may be achieved through a number of different techniques (as will be discussed), and each of these facilitate a quick and effective result without placing a high demand on computer processing resources. This result may be the determination of a change to one or more scanning parameters from the first imaging scan so that corrective action can be taken in a second imaging scan. This ensures that the user may obtain a high quality scanned image of the target with minimal delay.

In a particularly desirable implementation, the first imaging scan is performed across a first scanning region comprising the one or more AOI, and determining a change to one or more scanning parameters comprises selecting a second scanning region on the target that is different from the first scanning region. This may be the case, for instance, where the focus tracking data indicates that the one or more AOI initially selected were too small to fully capture the area of the target occupied by the sample. A pathologist will typically want to capture the entire sample within the scanned image, and so if the analysis suggests that the first scanning region was too small then it is advantageous to increase the scanning region accordingly. Imaging scans are time-consuming however and so in order to reduce the time required for the second imaging scan it is desirable to only increase the scanning area for a second scan to the amount required to encompass the sample. Analysing the efficacy of the first imaging scan therefore preferably comprises: identifying one or more boundary locations on the target where the focus control data indicates that the detector array was predominantly in focus at a boundary of the first scanning region; and selecting a second scanning region preferably comprises adjusting the first scanning region to incorporate an area of the target, outside of the first scanning region, surrounding the one or more boundary locations. The first scanning region may be increased by a pre-set amount surrounding the boundary location(s) in attempt to encompass the outline of the sample outside of the first scanning region. Alternatively, a mathematical prediction may be made of the shape of the sample on the target. In particular, analysing the efficacy of the first imaging scan may comprise identifying one or more sample focus regions on the target from the focus control data, wherein the focus control data indicates that the detector array was predominantly in focus throughout the one or more sample focus regions; and selecting a second scanning region may comprise interpolating a region of the target across which the sample extends outside of the one or more sample focus regions imaged during the first imaging scan. The shape of the interpolated region may be found by applying a shape fitting to an outline of a said sample focus region, such as fitting a circle or arc or spline curve to a tissue edge determined from the focus control data. This enables a more intelligent estimation to be made of where the sample extends outside of the first scanning region so that the scanning region is extended by the amount necessary to cover the sample, without also extending over regions of the target where the sample is absent.

Evaluating the efficacy of the first imaging scan preferably further comprises identifying one or more poor focus regions on the target, wherein the focus control data indicates the that the detector array was predominantly out of focus throughout the one or more poor focus regions during the first imaging scan. The poor focus region(s) may be used in the process of determining the second scanning area. Alternatively, or additionally, determining a change to one or more scanning parameters may comprise adjusting a focusing procedure so as to obtain images of the target at a different focal height within one or more regions of the target, such as the one or more poor focus regions, during the second imaging scan in comparison with the corresponding images from the first imaging scan. Such a scenario may occur where the analysis of the focus control data indicates that the detector array was not properly focused on the sample in one or more AOI during the first imaging scan. A change in a scanning parameter, in the form of a new focusing procedure, is then determined so that the detector array has a different focus within these regions during a second imaging scan.

It is typical for the first imaging scan to be preceded by pre-scan which is performed at a much larger depth of focus so as to obtain a low-resolution image of the target from which the one or more AOI may be selected. In particular, the method preferably further comprises: performing a pre-scan so as to generate a pre-scan image of the target, wherein the depth of focus for the pre-scan is in excess of 500 micrometres and wherein the depth of focus for each image acquired during the first imaging scan is below 3 micrometres; and performing an automated image analysis of the pre-scan image to produce a first probability map indicating where the sample is expected to be present on the target, wherein the one or more AOI are selected from the first probability map. This process of performing a pre-scan to identify one or more AOI has been found to be particularly fast and effective in enabling the parameters to be set from which the first imaging scan can be performed.

The detector array preferably comprises an array of photodetectors, typically arranged as a narrow strip of CCDs. As such the detector array is typically a line detector but it could also be a 2D camera. The first imaging scan typically further comprises generating a first image of the target from the images acquired along the image scan path. Such an image may correspond to the combination of each of the individual images or "lines" acquired by the detector array along the image scan path. The first image may therefore have a relatively high resolution and so require significant computer processing resources to load. It is preferable therefore for a second image of the target to be derived from the first image, wherein the resolution of the second image is lower than the resolution of the first image. The second image may be viewed by a user to obtain a "snapshot" of the target at low magnification without the additional data present in the first image needing to be loaded by a computing system. Advantageously this second image may be further used to assist with the identification of the one or more poor focus regions earlier described because it will have a much smaller depth of focus in comparison with the pre-scan image used to select the one or more AOI. Surface detail, such as dirt or scratches on the target, which may have been visible in the pre-scan image and incorrectly identified as corresponding to sample regions, will likely therefore not appear in the first or second image. It is helpful to therefore identify this surface detail so that a second scan is not unnecessarily performed across regions of the target which are occluded by surface detail and where the sample may not be present. Analysing the efficacy of the first imaging scan may therefore further comprise: performing an automated image analysis of the second image to produce a second probability map for regions of the target where the sample is expected to be present; and identifying surface detail in the pre-scan image corresponding to locations on the target where the first probability map indicates the sample is expected to be present and the second probability map indicates that the sample is not present; wherein said one or more poor focus regions exclude locations on the target having said surface detail. The resolution of the second image is preferably equal or approximately equal to the resolution of the pre-scan image. This enables the same or similar algorithms to be used to generate the second probability map as were used to generated the first probability map without incurring significant processing resources. This also enables effective comparison between the first and second probability maps for the identification of the surface detail.

The focus control data may further comprise an estimated focal surface for the target (also referred to as the "target height") and/or the actual focal height of the detector array. From this data it is hence be possible to identify the difference between where the detector array was and where it was desired to be for any image acquired during the first imaging scan. This difference is a known positional error. There may be a tolerance to the positional error but when this tolerance is exceeded the corresponding locations may be identified for the performance of a second imaging scan. For example, the focus control data may comprise an estimated focal surface of the target at each location along the image scan path, and the actual focal height of the detector array may be monitored for each location along the image scan path where an image is acquired. Identifying one or more poor focus regions on the target may then comprise identifying one or more positional error locations at which the difference between the estimated focal surface and the actual focal height of the detector array exceeds an error threshold. The error threshold is typically approximately equal to or exceeds the depth of focus for the detector array.

Automated image analysis techniques for analysing the quality of an image and, in particular, whether a sample is sufficiently focused in the image are known, as discussed in the background section. However, such techniques are typically computationally intensive and therefore time-consuming. It is desirable therefore to limit the regions of the image for which such techniques are applied so that regions of the image which are known to be in focus are excluded. The process of analysing the image can then be restricted to the remaining regions where the focus is considered poor or unknown. This can advantageously be achieved through use of the focus control data. In particular, the first imaging scan further may comprise the generation of a first image of the target from the images acquired along the image scan path, as earlier discussed. Identifying one or more poor focus regions may then further comprise the performance of an automated image analysis of one or more sub-regions of the first image to identify if the focus of the first image is acceptable and designating each sub-region of the target for where the focus is unacceptable as a 'poor focus region', wherein the one or more sub-regions are selected based on the focus control data. Preferably the one or more sub-regions include the positional error locations. The one or more sub-regions may also be determined based on the area of the target occupied by the positional error locations.

Determining a change to one or more scanning parameters may comprise adjusting a focusing procedure for the second imaging scan, as earlier discussed. This focusing procedure may rely on the measurement of an in-focus position for at least one seed location on the target. In particular, prior to the first imaging scan, the method typically further comprises measuring the in-focus position for at least one seed location in the one or more AOI, and setting the focal height at one or more locations along the image scan path based on the measured in-focus position for the seed location(s). The one or more scanning parameters that are changed may therefore be selected from the group comprising: the area of the target to be imaged, the number of seed locations on the target, and the position of the seed location(s) on the target. Furthermore, analysing the efficacy of the first imaging scan may comprise identifying an error in the in-focus position measured for one or more said seed locations, which may be performed by comparing the focus control data from the first imaging scan with the measured in-focus position for the one or more seed locations prior to the first imaging scan. For example, comparing the focus control data from the first imaging scan with the measured in-focus position for the one or more seed locations prior to the first imaging scan may comprise comparing the focus control data from the seed location during the first imaging scan with the measured in-focus position for the one or more seed locations prior to the first imaging scan. The focal height of the detector array is typically modulated along the image scan path so as to track an estimated focal surface of the target based on the focus control data acquired. The focal height of the detector array will therefore not necessarily arrive at the measured in-focus position for the seed location during the first imaging scan, however if the focal height is significantly different (for example the difference is above a threshold separation) then the in-focus position may be identified as being in error. The focal height at one or more locations along the image scan path is based on the measured in-focus position for the seed location(s) and so if this in-focus position is found to be in error then this will typically affect the efficacy of the imaging scan. Determining a change to one or more scanning parameters from the first imaging scan may then comprise selecting a new seed location at a position on the target where the focus control data indicates the detector array was out of focus during the first imaging scan.

The first imaging scan may be performed across a plurality of AOI and the in-focus position measured by adjusting the focal height of the detector array through a range of positions normal to the surface of the target at each said seed location. If the average focus of each of these are not similar or within expected tolerances due to slide tilt, slide distortion, or thickness variance of tissue then it can be assumed that the detector array will not have correctly focused on the sample in at least one of the AOIs during the imaging scan. Analysing the efficacy of the first imaging scan may therefore comprise calculating an average focal height of the sample in each said AOI from the focus control data. Then, responsive to finding that the separation between the average focal height for a first said AOI and a second said AOI exceeds a threshold distance, the determining of a change to one or more scanning parameters from the first imaging scan may comprise modifying the range of positions for which the focal height is adjusted when monitoring the in-focus position at the seed location in the first AOI to exclude the average focal height for the first AOI calculated from the first imaging scan, wherein the average focal height calculated for the first AOI exceeds the average focal height calculated for the second AOI. The lowest focus level of the AOIs will typically give a good indication of the correct tissue focus level. The average focal height calculated for the second AOI is preferably therefore the lowest focal height from the group comprising the average focal height calculated for each said AOI. This technique enables the parameters of a second imaging scan to be determined so that each AOI is correctly imaged.

Once the parameters of the second imaging scan are set, in particular a change to one or more scanning parameters from the first imaging scan is determined, the second imaging scan may be performed. The method typically therefore further comprises performing the second imaging scan of the target using the detector array with the determined change in the one or more scanning parameters relative to the first imaging scan implemented.

A second aspect of the invention provides a computer program product containing instructions which, when executed using a microscope scanner comprising a detector array and a target comprising a sample, causes the microscope scanner to perform the method of the first aspect. The second aspect shares similar features and advantages as discussed in connection with the first aspect.

The microscope scanner is typically a bright-field microscope scanner, preferably still a virtual microscope, and the computer program product typically corresponds to a non-transient computer readable medium, such as a hard drive. The target may take a number of forms; however, preferably the target comprises a biological tissue sample. The target preferably shows no substantial variation in surface height and so is essentially flat. For example, the target could be a stained tissue extract that has been sliced and retained between flat glass slides.

BRIEF DESCRIPTION OF THE DRAWINGS

Embodiments of the invention will now be discussed with reference to the following illustrations in which.

DETAILED DESCRIPTION

Figure 1:
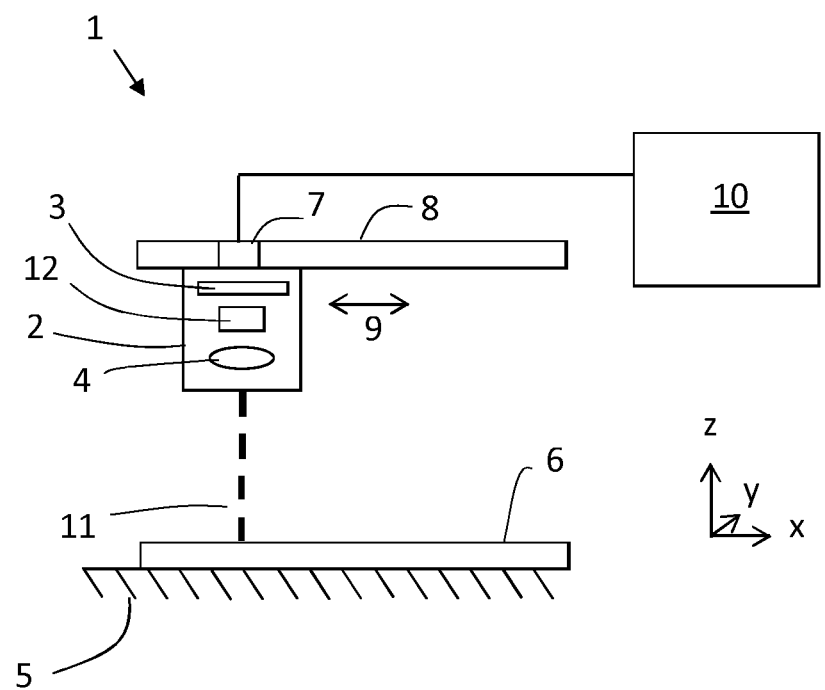
FIG. 1 is a schematic illustration of a microscope scanner to be operated in accordance with an embodiment of the invention.

An example of a bright-field microscope scanner 1 is shown in FIG. 1. This comprises a scan head 2 comprising a line scanner 3 in the form of a linear photo-detector array. The scan head 2 further comprises an adjustable focus system 4 and a pre-scan camera 12. A platen 5 is provided upon which is positioned a target 6 in the form of a pathology slide containing a sample. A drive mechanism 7 attaches the scan head 2 to a track 8 such that the scan head can be moved with respect to the target 6 as indicated by the arrows 9. The track 8 can also allow the scan head 2 to be displaced laterally (perpendicular to the optical axis 11 of the scan head 2 and the scanning direction 9) for imaging adjacent swathes. The microscope scanner 1 is controlled using an electronic controller in the form of a computer system 10. Coordinate axes are also provided in FIG. 1 for reference to in the following example. The ordinate z-axis is aligned with the optical axis of the scan head 2 and the focal height of the target 6, whereas the abscissa x-axis represents the scan direction (parallel to the arrow 9 in FIG. 1). The surface of the target 6 is aligned in the xy plane and a lens of the adjustable focus system 4 is moveable along the z-axis. In an alternative example the scan head 2 remains stationary and the target 6 is moved in the xy plane in order to achieve relative motion between the scan head 2 and the target 6 during the scanning processes. The pre-scan camera 12 may also form a separate unit from the scan head 2 and operable independently of the scan head 2.

The operation of the microscope scanner 1 in performing a method according to an embodiment of the invention will now be described with reference to FIGS. 2 to 5. The method begins at step 100 (FIG. 2) where a pre-scan is performed to acquire a pre-scan image of the target 6. The scan head 2 is traversed along the track 8 with images of the target 6 being acquired using the pre-scan camera 12. The pre-scan camera 12 is configured to acquire images of the target at a depth of focus of 1 mm, which is significantly higher than the thickness of the sample (typically between 2 to 10 μm). The focal height of the pre-scan camera 12 is therefore not adjusted during the pre-scan and the pre-scan image is rapidly produced at a relatively low resolution, for example at 1200 dpi (47 lines per mm). The pre-scan image provides an overview of the outline of the sample on the target 6 from which one or more areas of interest, AOI, can be selected for imaging during a first imaging scan. The imaging scan progresses at a much slower speed in comparison with the pre-scan and so it is desirable to only image those areas on the target 6 where the sample is present during the imaging scan. The "blank" or "empty" regions of the target can be excluded. The pre-scan image is processed at step 101 using conventional software so that each region in which the sample is visible in the pre-scan image is identified as an AOI. More specifically, an automated image analysis of the pre-scan image is used to produce a first probability map indicating where the sample is expected to be present on the target, with the one or more AOI being selected from the first probability map. Typically, the boundaries of the AOI may be selected so as to lie just outside the outer edges of the sample (as identified from the pre-scan image) so that the sample is fully contained within the AOI. The pre-scan image may then be displayed to a user using the computer system 10 with the one or more AOI demarcated. Optionally the user may then manually adjust the boundaries of the one or more AOI using the computer system if desired.

The method then proceeds to step 102, at which point a seed location is selected in the xy plane within each AOI (typically at the centre of the AOI) and the focal height of the sample measured at that location using the line scanner 3. The focal height of the adjustable focus system 4 is varied through a predefined range of focal heights so as to obtain image information from the target 6 at a number of different focal positions along the z-axis with a depth of focus to around 1 μm. An in-focus position is then calculated from the image information at each focal position through use of a focus parameter in the form of a focus merit value. Typically, a focus merit value is a numerical measure of the degree of complexity within an image, wherein the greater the value the greater the detail in the image. A more in-focus image has a corresponding higher merit value. The focal height having the highest merit value is then stored as the measured in-focus position for the seed location and the process repeated for any remaining seed locations identified.

An image scan path is calculated across which the scan head 2 will be moved so that the line scanner 3 images the entire surface of the one or more AOI. The line scanner 3 is moved to a starting location along the image scan path and focused at the in-focus position for the respective AOI. The first imaging scan then commences at step 103, at which point the line scan head 2 is moved across the image scan path and images obtained of a plurality of adjacent locations on the target 6. For each location, focus control data is recorded including: the focus merit value for the line scanner 3, an estimate of where the in-focus level is and the actual focal height of the line scanner 3. The estimated in-focus level may be calculated using techniques known in the art, such as described in U.S. Pat. No. 9,116,035 B2. The focal height of the line scanner 3 is adjusted between each xy location along the image scan path in the direction of or to the estimated in-focus position. The target 6 is imaged in one or more swathes in this manner until each AOI has been imaged entirely. Then, at step 104, the individual images acquired by the line scanner 3 are combined together to form a first image of the target.

It is desirable for the first image to include the entirety of the sample across the xy plane and to be in-focus throughout. However, a number of errors can occur in the preceding method steps that prevent this from occurring. The efficacy of the first imaging scan (which may be thought of as the extent to which the first imaging scan produced the intended result) is then analysed at step 105. This analysis may involve any number of individual sub-processes for checking respective criteria, examples of which will be discussed in further detail with reference to FIG. 3. Typically, however, it involves an assessment regarding whether the area on the target imaged sufficiently covered the area of the target 6 occupied by the sample, and/or whether the sample is correctly focused throughout the image. Importantly, this process is performed with reference to the focus control data acquired during the first imaging scan. Such an analysis is not computationally demanding and so errors in the first imaging scan can be effectively identified in a time-efficient manner. If any errors are identified, a change to a scanning parameter is determined at step 106 so that these may be corrected in a second imaging scan. The second imaging scan is then performed at step 107 with the relevant changes in the scanning parameter (such as the focusing procedure used or the area of the target 6 imaged) so as to improve the efficacy of the imaging scan.

Figure 2:
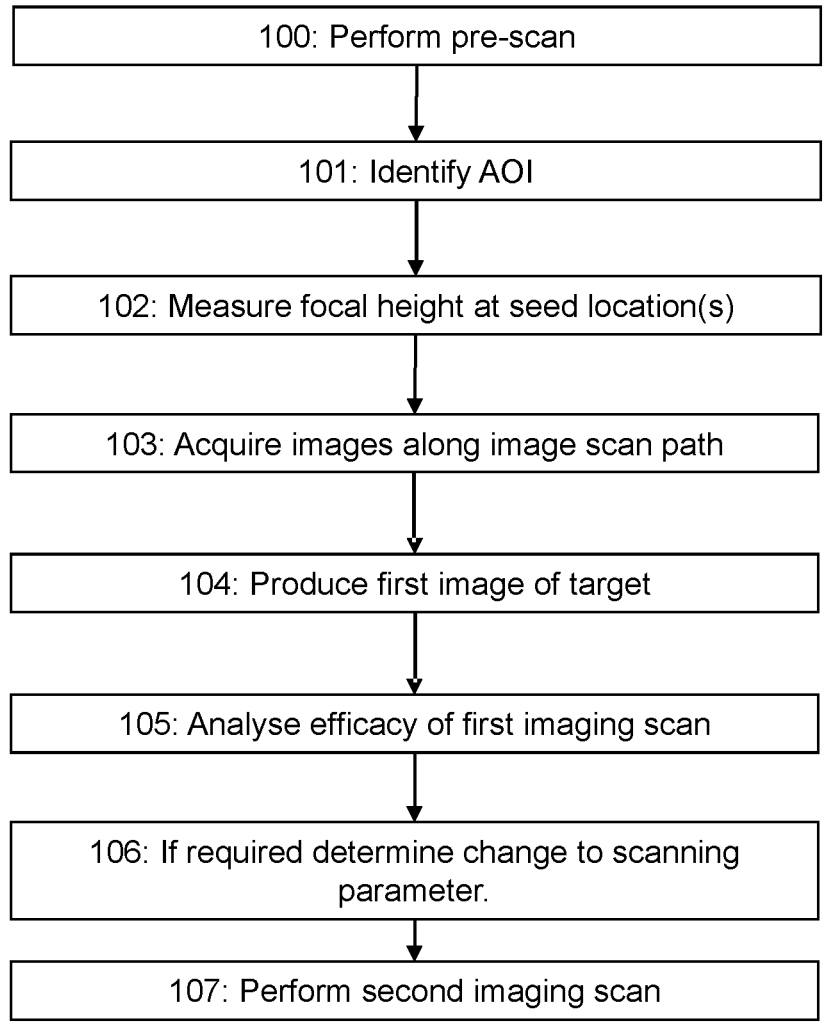
FIG. 2 is a flowchart indicating an embodiment of the invention.
Figure 3:
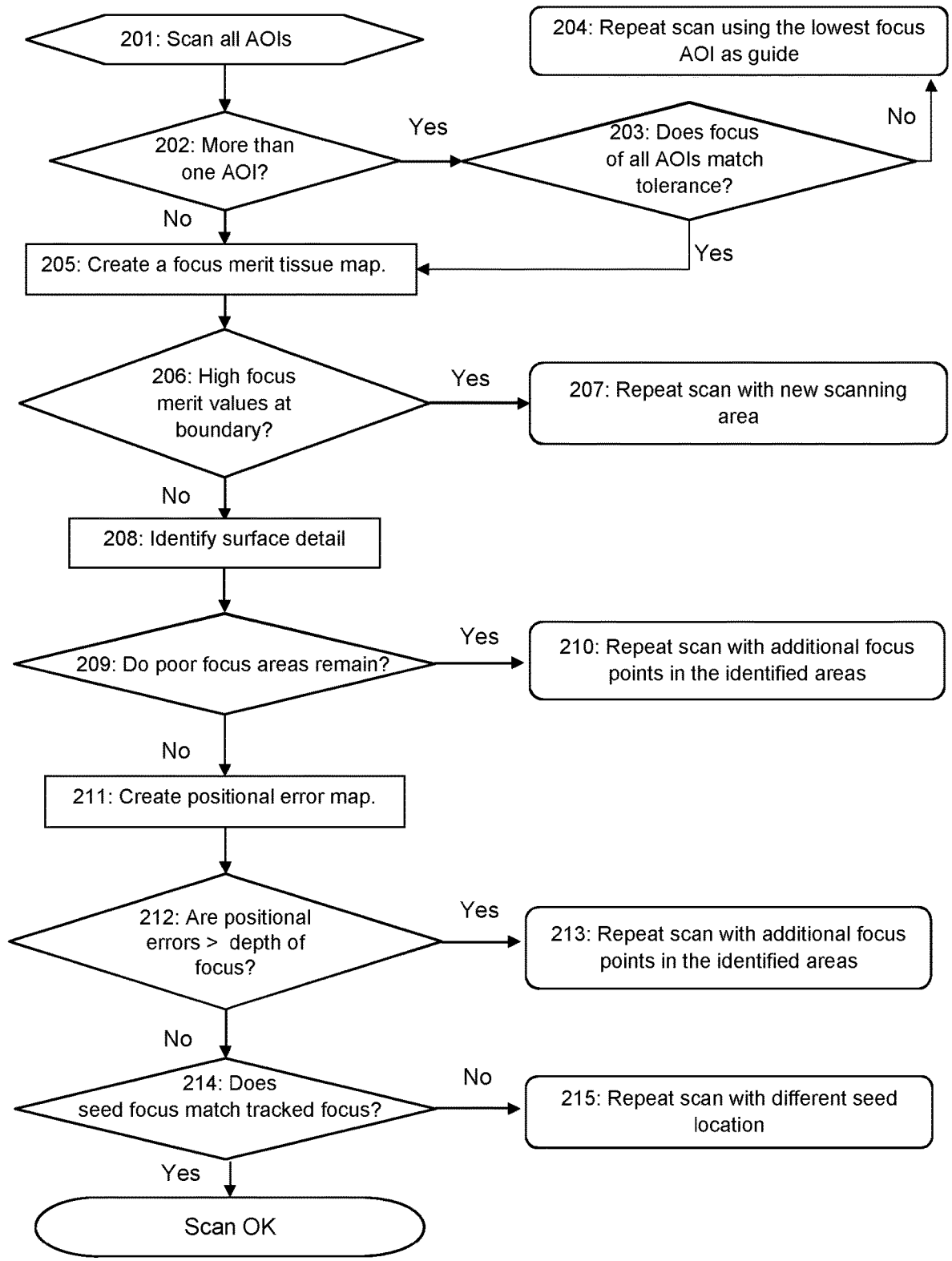
FIG. 3 is a flow chart indicating processes for analysing the efficacy of an imaging scan in accordance with an embodiment of the invention.

The embodiment of FIG. 2 will now be discussed in further detail with reference to the flowchart of FIG. 3. At step 201 the first imaging scan is performed so that each AOI is imaged using the line scanner 3. This is equivalent to step 103 in FIG. 2. The method then proceeds to step 202 wherein the computer system 10 performs the first of a series of tests to analyse the efficacy of the first imaging scan. The question is asked whether more than one AOI were imaged during the first imaging scan, and if the answer is "yes" then the method proceeds to step 203, otherwise it proceeds to step 205.

If the average focal height of the AOIs are not similar to each other or within expected tolerances due to slide tilt, slide distortion, or thickness variance of tissue, then it can be assumed that at least one of the AOIs will not have the correct focus. Typically, the line scanner 3 will have mistakenly focused on something on the top of the coverslip for the target 6 and if there is enough detail present on the top of the coverslip it will appear to have scanned. In this case there will be typically be the thickness of a coverslip difference between focus levels, around 170 µm. Therefore, at step 203, an assessment is made whether the average focus of each AOI matches a tolerance. The AOI having the lowest average focal height is found and the tolerance is set to within a threshold difference from the lowest average focal height. The threshold may be set depending on the application but it typically exceeds the thickness of the sample and in this case is 20 µm. More generally the threshold might typically be selected within the range of 10-30 µm. If the average focus of each AOI is below this threshold then it can be assumed that the line scanner 3 has not focused on a region of the coverslip and the method proceeds to step 205. Otherwise, if the average focus one of the AOI exceeds the threshold then the method proceeds to step 204. At step 204 a change in a scanning parameter from the first imaging scan is determined for the performance of a second imaging scan. In particular, a change in the focusing procedure is determined. The lowest average focal height of the AOI will give a good indication of the correct tissue focus level. This enables a new scan to be performed at step 204 but because the approximate focus level is now known, the range of focal heights searched at step 102 for each seed location can be restricted, for example to within the threshold focal range earlier found. This ensures that the line scanner 3 does not focus on the coverslip during the second imaging scan and so improves the efficacy of the scan.

At step 205 a focus merit tissue map is generated indicating the focus merit value calculated for each location along the image scan path during the preceding imaging scan. From the focus merit values it can be determined where the line scanner 3 was in focus. Where tissue is present, even on slightly out of focus areas, focus merit values will be large. This gives an alternative map of where tissue is present. If high focus merit values are recorded at the edge of a first scanning region imaged during the first imaging scan then it can be assumed that the AOI was set too small to capture all of the tissue. At step 206 any "boundary locations" where the focus merit values are above a threshold number at a boundary of the AOI are identified. If there are a series of adjacent boundary locations identified, indicating that the first scanning region was too small to capture the sample, the method proceeds to step 207.

At step 207 a change to a scanning parameter is determined by calculating a second scanning region covering a larger portion of the target than the first scanning region. The second scanning region may simply be a small increase in the boundary where the first scanning region was not large enough or a mathematical prediction of the sample shape, such as fitting a circle or arc or spline curve to a tissue edge determined from the focus merit tissue map. It is desirable not to increase the scanning region unnecessarily so as to cover regions of the target where the sample can be assumed to be absent as this will unnecessarily increase the scanning time. Optionally, if it is known that the user altered the AOI boundaries at the boundary location(s), then it may be assumed that the user desired not to scan all of the tissue. Otherwise a second imaging scan is then performed across the new scanning region so as to image the sample in the locations not included to the first imaging scan.

If the focus merit map does not indicate that the first scanning region was too small to sufficiently capture the sample then the method proceeds from step 206 to step 208. Any surface detail visible in the pre-scan image is identified at step 208. This is achieved through a comparison of the pre-scan image with the imaging data acquired from the first imaging scan. It will be recalled from step 104 (FIG. 2) that a first image of the target was produced corresponding to a combination of the individual images acquired during the imaging scan. This image will have a completely different numerical aperture and as such a completely different depth of focus to the pre-scan image. The pre-scan image will have a larger depth of focus which means defects such as dirt and scratches on the surface of the slide and coverslip are in focus whilst the small depth of focus of the imaging scan means the dirt and scratches on the surface of the slide and coverslip are not in focus. However, before the imaging data from the first imaging scan can be compared to the pre-scan image, the resolution of the first image is scaled down to a resolution similar or identical to the pre-scan image.

A typical Whole Slide Imaging image file contains multiple layers of images, each at a different resolution. This enables the image viewing application to zoom out of the image and move around the image without having to access large amounts of data. For example, if the image file has 0.25 µm pixels and the viewing application shows 2000×3000 pixels, to show this requires 6 Mpixels to be read which, uncompressed, is 18 Mbytes of data. With compression, this might only be 2 Mbytes of data. If the viewer were asked to display a larger area at lower resolution "zoom out" at, for example 10× the area, then to read this from the 0.25 µm pixel data would require 60 Mpixels or 20 Mbytes of compressed data. To avoid this condition, it is typical that the file contains an addition image that is near to the required resolution. For example, it may have an image that is 8× lower resolution than the full 0.25 µm resolution data which the viewer can read and use to display. This would enable the viewer to only read approximately 8 Mpixels or 3 Mbytes of data. How this arrangement operates is not relevant; however, the presence of this lower resolution data derived from the high resolution (HR) data enables rapid access to image data at a lower resolution than the full scan resolution. This lower resolution data will be referred to herein as the "second image" of the target and is analysed at step 208 to identify surface detail. The second image typically has a resolution that is similar to or identical to the pre-scan image. For example, the resolution of these images may be comparable to within a factor of two. The second image may then resolve similar sized features to the pre-scan image, and can be processed considerably faster than the HR "first image" (for example approximately 4000 times faster).

Figure 4A:
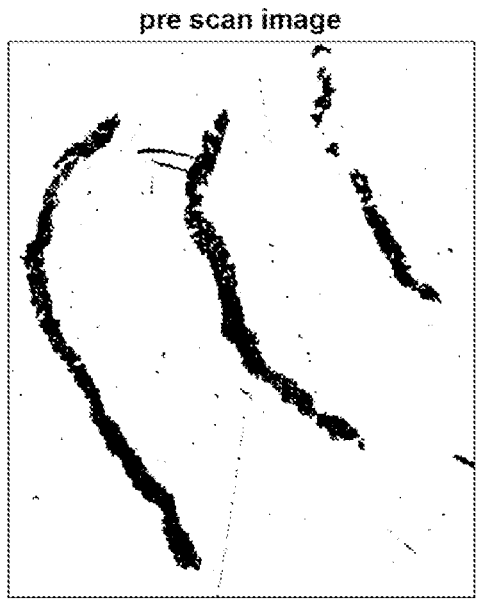
FIG. 4A is an example of a pre-scan image acquired in accordance with an embodiment of the invention.
Figure 4B:
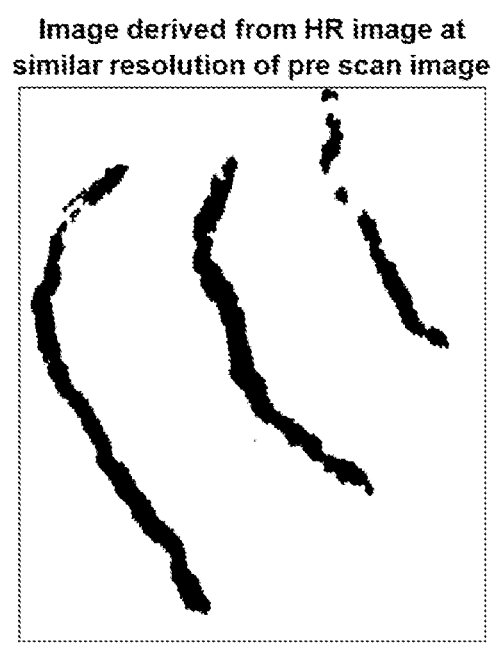
FIG. 4B is an example of a second image acquired in accordance with an embodiment of the invention.

FIG. 4A show an example of a pre-scan image of the target with two scratches shown in the upper middle portion of the image. The corresponding second image, derived from the first image, of similar or equal resolution to the pre-scan image is shown in FIG. 4B and does not show these scratches. It will be recalled that a first probability map of the pre-scan image was generated in step 101 in order to identify the one or more AOI. In step 208 a probability map (referred to herein as the "second probability map") is generated in a similar manner but using the second image of the target to identify regions of the image apparently showing the sample. The second probability map is then subtracted from the first probability map to show the regions of the target where surface detail is visible in the first image.

The method then proceeds from step 208 to step 209 where the focus control data from the first imaging scan is analysed to identify one or more "poor focus regions" where the line scanner 3 was not focused on the sample. This may be achieved by identifying locations on the target where the focus merit value was below a threshold number during the first imaging scan. It can be expected that the focus merit values recorded for the locations on the target where the surface detail was found may be below this threshold. Such locations may have only been imaged because they were incorrectly identified as having tissue in step 101 and so it is not necessary to repeat the imaging scan in these locations. However, if one or more poor focus regions remain (excluding the surface detail locations) then the method proceeds to step 210. Optionally the method only proceeds from step 209 to step 210 if the poor focus region(s) have a minimum size, for example a length of at least 0.5 mm in any direction, otherwise it proceeds to step 211. The minimum size may optionally be set by the user of the computer system 10. At step 210, a new focusing procedure is determined for the performance of a second imaging scan. In this case it is determined that the first imaging scan should be repeated but with the in-focus position being found for additional seed locations at step 101 within the one or more poor focus regions. With the in-focus position being measured at these additional locations, the second imaging scan will proceed with the line scanner 3 imaging the target at a different focal height across the one or more poor focus regions.

If the outcome of step 209 is that there are no remaining poor focus regions then the method instead proceeds to step 211. For each location along the image scan path the focus control data provides an estimate of the correct focal height for the sample (also referred to as the "focal surface") and a record of the actual focal height for the line scanner 3 when the image was acquired. From this it can be determined where the scanner focus was outside one depth of focus of the tissue focus, thereby enabling areas of tissue where the focus was known to be in error to be identified. This might be more typical at the very edge of the tissue as the scanner has to predict where the focus of the tissue is as it approaches the tissue. Due to a number of factors, such as the tissue being thinner or thicker at the edges or the slide distorting, the prediction is in error and when the scanner reaches the tissue, after passing over clear slide, the focus mechanism identifies the prediction error but it can take a little distance to correct the prediction error. Other conditions that may occur which give this focus tracking error may include the tissue changing focus rapidly such as when the tissue is folded over itself or buckled.

Figures 5A, 5B:
FIG. 5A is a first example of a poor focus regions on the target identified in accordance with an embodiment of the invention.
FIG. 5B is a second example of a poor focus regions on the target identified in accordance with an embodiment of the invention.

At step 211 a positional error map is created in which all areas of the tissue for which the actual focal height of the line scanner 3 deviated from the actual focal surface of the sample by at least 1 µm, or where the correct focal height was unknown, are identified. FIG. 5A shows an image of the target in which the clear slide is shown as white and the regions of the sample that are in focus are shown as grey. The poor focus regions (where the positional error exceeds 1 µm or the focus is unknown) are shown as black. There will be a tolerance to the positional error but when the error is too large it may be deemed unacceptable. Having identified the regions shown in black, an automated analysis of the quality of the first image may be performed at step 213 that is limited to these regions, for example using an algorithm similar to that described in US 2019/0266726 (earlier discussed). Other automated analysis techniques may alternatively be used, including 2D standard deviations, gradient analysis and edge filtering (as known in the art). A result of the analysis will either be that the focus of the image is acceptable for the purposes of the user (typically for performing a pathology assessment), or it is unacceptable. Although the process of image analysis is typically computationally demanding, because only a small proportion of the first image is now required for analysis, it can be completed relatively quickly. In the example of FIG. 5A less than 1% of the image is required to be examined. Alternatively, it is possible to only examine the HR "first image" for the area of tissue where the focus is unknown, meaning that an even smaller proportion of the image is analysed in this manner.

FIG. 5B provides a second example of an image of the target that is the same as FIG. 5A except that the regions now identified as being of acceptable focus quality (following performance of the above image analysis technique) are grey also. If any poor focus areas remain in the first image (corresponding to those regions marked black), or if such areas exceed a threshold proportion of the first image, a change to a scanning parameter may be determined for the performance of a second imaging scan. For example, it may be determined that the first imaging scan should be repeated with in-focus measurements being taken for additional seed locations inside the remaining poor focus regions. Optionally the resulting map of errors may instead be displayed to a user as a guide to which areas of the image to examine, which will improve the speed and accuracy of the task.

If at step 212 it is determined that the positional errors do not exceed the depth of focus, or that the poor/unknown focus areas regions being of unacceptable quality do not occupy a threshold proportion of the first image, the method instead proceeds to step 214. The in-focus position initially calculated for one or more seed locations prior to the first imaging scan is compared with the estimated focal surface for that location identified during the first imaging scan. If these are not similar, for example to within a threshold separation of each other, then an error can be assumed to have occurred and the method proceeds to step 215. At step 215 a change in a focusing procedure is determined for the performance of a second imaging scan. In particular, the position of the seed location(s) is moved on the target. A second imaging scan may then proceed as described in FIG. 2 but with the new seed locations. If the result of step 215 is that each seed focus matches the tracked focus ascertained from the focus control data then first imaging scan is determined to be acceptable. The scanning parameters will then not require changing for the performance of a second imaging scan and the first image of the target generated in step 104 may be displayed to the user for analysis.

It will be appreciated that each of steps 203, 206, 209, 212 and 214 relate to examples of processes for analysing the efficacy of the first imaging scan using the focus control data and determining a change to one or more scanning parameters from the first imaging scan, for the performance of a second imaging scan, based on this analysis. After the second imaging scan is performed the quality-control process discussed with reference to FIG. 3 will generally be repeated until the imaging data produced by the preceding imaging scan is determined to be acceptable or a threshold number of iterations has been reached. In alternative embodiments any of these processes may be performed alone or in any combination before the second imaging scan is initiated. Multiple changes to scanning parameters may therefore be identified prior to commencing the second imaging scan in order to further reduce the overall time elapsed between starting the first imaging scan and outputting an image of the target that is suitable for analysis by the user.

In summary, an improved method for operating a microscope scanner is therefore provided, including a method for analysing the data generated by an imaging scan so as to ensure the target has been properly imaged. The analysis is advantageously performed using focus control data generated during the imaging scan. This enables a result to be obtained in a quick and efficient manner. If any errors are identified in the first imaging scan as a result of this analysis then a change to a scanning parameter is identified so that a second imaging scan may be performed that corrects this error.

The invention claimed is:

1. A method for operating a microscope scanner comprising a detector array, the method comprising:
   performing a pre-scan so as to generate a pre-scan image of a target, wherein the target comprises a sample, and wherein a depth of focus for the pre-scan is in excess of 500 micrometres;
   performing a first imaging scan of one or more area(s) of interest, AOI, on the target, wherein performing the first imaging scan comprises:
      moving the detector array relative to the target along an image scan path and acquiring an image of the target at each of a plurality of locations along the image scan path using the detector array, and wherein a depth of focus for each image acquired along the image scan path is below 3 micrometres;
      generating focus control data during the first imaging scan, wherein generating focus control data comprises calculating a focus merit value at each said location along the image scan path; and
      adjusting a focal height of the detector array along the image scan path based on said focus merit values; and
   analysing an efficacy of the first imaging scan using the focus control data and determining a change to one or more scanning parameters from the first imaging scan, for the performance of a second imaging scan, based on this analysis.

2. The method according to claim 1, wherein the first imaging scan is performed across a first scanning region comprising the one or more AOI, and wherein determining a change to one or more scanning parameters comprises selecting a second scanning region on the target that is different from the first scanning region.

3. The method according to claim 2, wherein analysing the efficacy of the first imaging scan comprises:
   identifying one or more boundary locations on the target where the focus control data indicates that the detector array was predominantly in focus at a boundary of the first scanning region; and
   wherein selecting a second scanning region comprises adjusting the first scanning region to incorporate an area of the target outside of the first scanning region surrounding the one or more boundary locations.

4. The method according to claim 2, wherein analysing the efficacy of the first imaging scan comprises identifying one or more sample focus regions on the target from the focus control data, wherein the focus control data indicates that the detector array was predominantly in focus throughout the one or more sample focus regions; and
   wherein selecting a second scanning region comprises interpolating a region of the target across which the sample extends outside of the one or more sample focus regions imaged during the first imaging scan, wherein a shape of the interpolated region is found by applying a shape fitting to an outline of a said sample focus region.

5. The method according to claim 1, wherein evaluating the efficacy of the first imaging scan further comprises identifying one or more poor focus regions on the target, wherein the focus control data indicates that the detector array was predominantly out of focus throughout the one or more poor focus regions during the first imaging scan; and
   wherein determining a change to one or more scanning parameters comprises adjusting a focusing procedure so as to obtain images of the target at a different focal height within the one or more poor focus regions during the second imaging scan in comparison with corresponding images from the first imaging scan.

6. The method according to claim 5, further comprising:
   performing an automated image analysis of the pre-scan image to produce a first probability map indicating where the sample is expected to be present on the target, wherein the one or more AOI are selected from the first probability map.

7. The method according to claim 6, wherein the first imaging scan further comprises generating a first image of the target from the images acquired along the image scan path, and deriving a second image of the target from the first image, wherein a resolution of the second image is less than a resolution of the first image; and
   wherein analysing the efficacy of the first imaging scan further comprises:
      performing an automated image analysis of the second image to produce a second probability map for regions of the target where the sample is expected to be present; and
      identifying surface detail in the pre-scan image corresponding to locations on the target where the first probability map indicates the sample is expected to be present and the second probability map indicates that the sample is not present;
   wherein said one or more poor focus regions exclude locations on the target having said surface detail.

8. The method according to claim 5, wherein the focus control data comprises an estimated focal surface of the target at each location along the image scan path, and wherein an actual focal height of the detector array is monitored for each location along the image scan path where an image is acquired; and wherein identifying one or more poor focus regions on the target comprises identifying one or more positional error locations at which a difference between the estimated focal surface and the actual focal height of the detector array exceeds an error threshold.

9. The method according to claim 5, wherein the first imaging scan further comprises generating a first image of the target from the images acquired along the image scan path; and wherein identifying one or more poor focus regions further comprises performing an automated image analysis of one or more sub-regions of the first image to identify if the focus of the first image is acceptable and designating each sub-region of the target for where the focus is unacceptable as a poor focus region, wherein the one or more sub-regions are selected based on the focus control data.

10. The method according to claim 9, wherein the one or more sub-regions include one or more positional error locations.

11. The method according to claim 1, wherein prior to the first imaging scan, the method further comprises: measuring an in-focus position for at least one seed location in the one or more AOI, and setting the focal height at one or more locations along the image scan path based on the measured in-focus position for the seed location(s).

12. The method according to claim 11, wherein the one or more scanning parameters are selected from the group comprising: the area of the target to be imaged, a number of seed locations on the target, and the in-focus position of the seed location(s) on the target.

13. The method according to claim 11, wherein analysing the efficacy of the first imaging scan comprises identifying an error in the in-focus position measured for one or more said seed locations.

14. The method according to claim 13, wherein identifying an error in the in-focus position comprises comparing the focus control data from the first imaging scan with the measured in-focus position for the one or more seed locations prior to the first imaging scan.

15. The method according to claim 14, wherein comparing the focus control data from the first imaging scan with the measured in-focus position for the one or more seed locations prior to the first imaging scan comprises comparing the focus control data from the seed location during the first imaging scan with the measured in-focus position for the one or more seed locations prior to the first imaging scan.

16. The method according to claim 11, wherein determining a change to one or more scanning parameters from the first imaging scan comprises selecting a new seed location at a position on the target where the focus control data indicates the detector array was out of focus during the first imaging scan.

17. The method according to claim 11, wherein the first imaging scan is performed across a plurality of AOI, wherein the in-focus position is measured by adjusting the focal height of the detector array through a range of positions normal to a surface of the target at each said seed location; and wherein analysing the efficacy of the first imaging scan comprises calculating an average focal height of the sample in each said AOI from the focus control data; and wherein, responsive to finding that a separation between the average focal height for a first said AOI and a second said AOI exceeds a threshold distance, the determining of a change to one or more scanning parameters from the first imaging scan comprises modifying the range of positions for which the focal height is adjusted when monitoring the in-focus position at the seed location in the first AOI to exclude the average focal height for the first AOI calculated from the first imaging scan, wherein the average focal height calculated for the first AOI exceeds the average focal height calculated for the second AOI.

18. The method according to claim 17, wherein the average focal height calculated for the second AOI is a lowest focal height from the group comprising the average focal height calculated for each said AOI.

19. The method according to claim 1, further comprising:
performing the second imaging scan of the target using the detector array with the determined change in the one or more scanning parameters relative to the first imaging scan implemented.

20. A non-transitory computer program product containing instructions which, when executed by a microscope scanner comprising a detector array and a target comprising a sample, causes the microscope scanner to perform the method of claim 1.

* * * * *